US010788834B2

United States Patent
Delp et al.

(10) Patent No.: US 10,788,834 B2
(45) Date of Patent: Sep. 29, 2020

(54) SYSTEM, METHOD, AND COMPUTER-READABLE MEDIUM FOR AUTONOMOUS VEHICLE RESPONSE TO BICYCLES AT INTERSECTIONS

(71) Applicant: TOYOTA RESEARCH INSTITUTE, INC., Los Altos, CA (US)

(72) Inventors: Michael J. Delp, Ann Arbor, MI (US); Ruijia Feng, Ann Arbor, MI (US); Shan Bao, Ann Arbor, MI (US)

(73) Assignees: TOYOTA RESEARCH INSTITUTE, INC., Los Altos, CA (US); The Regents of the University of Michigan, Ann Arbor, MI (US)

( * ) Notice: Subject to any disclaimer, the term of this patent is extended or adjusted under 35 U.S.C. 154(b) by 171 days.

(21) Appl. No.: 16/029,242

(22) Filed: Jul. 6, 2018

(65) Prior Publication Data
US 2020/0012285 A1    Jan. 9, 2020

(51) Int. Cl.
*G05D 1/02* (2020.01)
*B60W 30/095* (2012.01)
(Continued)

(52) U.S. Cl.
CPC .......... *G05D 1/0214* (2013.01); *G05D 1/0088* (2013.01); *G05D 1/0246* (2013.01);
(Continued)

(58) Field of Classification Search
CPC .......... G05D 1/02; G05D 1/00; B60W 30/095; B60W 50/10; B60W 50/14; G08G 1/16;
(Continued)

(56) References Cited

U.S. PATENT DOCUMENTS 9,014,905 B1    4/2015  Kretzschmar et al.
9,495,874 B1   11/2016  Zhu et al.
(Continued)

FOREIGN PATENT DOCUMENTS

CN    103942359 A    7/2014

OTHER PUBLICATIONS

Bixiang Li, et al., "The behavior analysis of pedestrian-cyclist interaction at non-signalized intersection on campus: Conflict and interference"; Procedia Manufacturing, vol. 3, 2015, pp. 3345-3352.
(Continued)

*Primary Examiner* — Yuri Kan
(74) *Attorney, Agent, or Firm* — Oblon, McClelland, Maier & Neustadt, L.L.P.

(57) ABSTRACT

An autonomous vehicle can plan a path of the autonomous vehicle at an intersection where cyclists are also present. The autonomous vehicle includes an imaging device and processing circuitry configured to receive information from the imaging device and then identify a position of a cyclist in a traffic intersection based on the information from the imaging device. Additionally, a future path of the cyclist is predicted based on the position of the cyclist in the traffic intersection and a path of the autonomous vehicle is planned based on the predicted future path of the cyclist. Further, it can be determine if the cyclist followed the predicted future path, and the planned path of the autonomous vehicle is updated in response to the cyclist not following the predicted future path.

20 Claims, 4 Drawing Sheets

(51) Int. Cl.
  *B60Q 1/00* (2006.01)
  *G06N 7/00* (2006.01)
  *G05D 1/00* (2006.01)
  *G06T 7/70* (2017.01)
  *G06K 9/00* (2006.01)
  *G08G 1/16* (2006.01)

(52) U.S. Cl.
  CPC ......... *G06K 9/00805* (2013.01); *G06N 7/005* (2013.01); *G06T 7/70* (2017.01); *G08G 1/166* (2013.01); *G05D 2201/0213* (2013.01); *G06T 2207/30261* (2013.01)

(58) Field of Classification Search
  CPC .. G08G 5/04; B62M 6/50; B60Q 1/50; B60Q 1/00
  See application file for complete search history.

(56) References Cited

U.S. PATENT DOCUMENTS

| | | | | |
|---|---|---|---|---|
| 10,077,047 | B2* | 9/2018 | Gutmann | B60W 50/0097 |
| 2009/0201140 | A1* | 8/2009 | Fargas | B60W 40/101 340/441 |
| 2017/0080952 | A1* | 3/2017 | Gupta | G08G 1/163 |
| 2017/0268896 | A1 | 9/2017 | Bai et al. | |
| 2017/0297588 | A1* | 10/2017 | Doshi | B60W 50/14 |
| 2017/0329332 | A1* | 11/2017 | Pilarski | B60W 50/0097 |
| 2018/0257548 | A1* | 9/2018 | Suzuki | B60Q 1/525 |
| 2018/0329418 | A1* | 11/2018 | Baalke | B60W 50/0097 |
| 2018/0365999 | A1* | 12/2018 | Wiklinska | G08G 1/166 |
| 2019/0043374 | A1* | 2/2019 | Mere | G08G 5/0013 |
| 2019/0096256 | A1* | 3/2019 | Rowell | G01S 17/58 |
| 2020/0010146 | A1* | 1/2020 | Berretta | G01C 15/00 |

OTHER PUBLICATIONS

Mohammed Elhenawy, et al., "Advanced Operations Focused on Connected Vehicles/Infrastructure (CVI-UTC)", Bicycle Naturalistic Data Collection, Jun. 15, 2016, 40 pages.

Alexander Mereu, "Analyzing the behavior of cyclists at intersections to improve behavior variability within micro-simulation traffic models", Master of Applied Science in Civil Engineering, 2015. 77 pages.

* cited by examiner

SYSTEM, METHOD, AND COMPUTER-READABLE MEDIUM FOR AUTONOMOUS VEHICLE RESPONSE TO BICYCLES AT INTERSECTIONS

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Riding bicycles as a form of transportation continues to grow in popularity. While sharing the road, cyclists are expected to follow all traffic laws in the same way that vehicles do. In practice, however, cyclists may not always obey all traffic laws. Even with the best intentions, a cyclist's top speed and acceleration cannot match a vehicle's capabilities. Although vehicle operators know that cyclists have a right to share the road and can be understanding of cyclists' capabilities, traffic intersections can be particularly dangerous. With the rise of autonomous vehicles, a solution for anticipating a cyclist's movement at a traffic intersection and responding accordingly is needed.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to aspects of the disclosed subject matter, an autonomous vehicle can plan a path of the autonomous vehicle at an intersection where cyclists are also present. The autonomous vehicle includes an imaging device and processing circuitry configured to receive information from the imaging device and then identify a position of a cyclist in a traffic intersection based on the information from the imaging device. Additionally, a future path of the cyclist is predicted based on the position of the cyclist in the traffic intersection and a path of the autonomous vehicle is planned based on the predicted future path of the cyclist. Further, it can be determine if the cyclist followed the predicted future path, and the planned path of the autonomous vehicle is updated in response to the cyclist not following the predicted future path. Additionally, the future path of a cyclist can be projected to other locations in the intersections.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "front," "rear," "side," and the like that may be used herein, merely describe points of reference and do not necessarily limit embodiments of the disclosed subject matter to any particular orientation or configuration.

Figure 1:
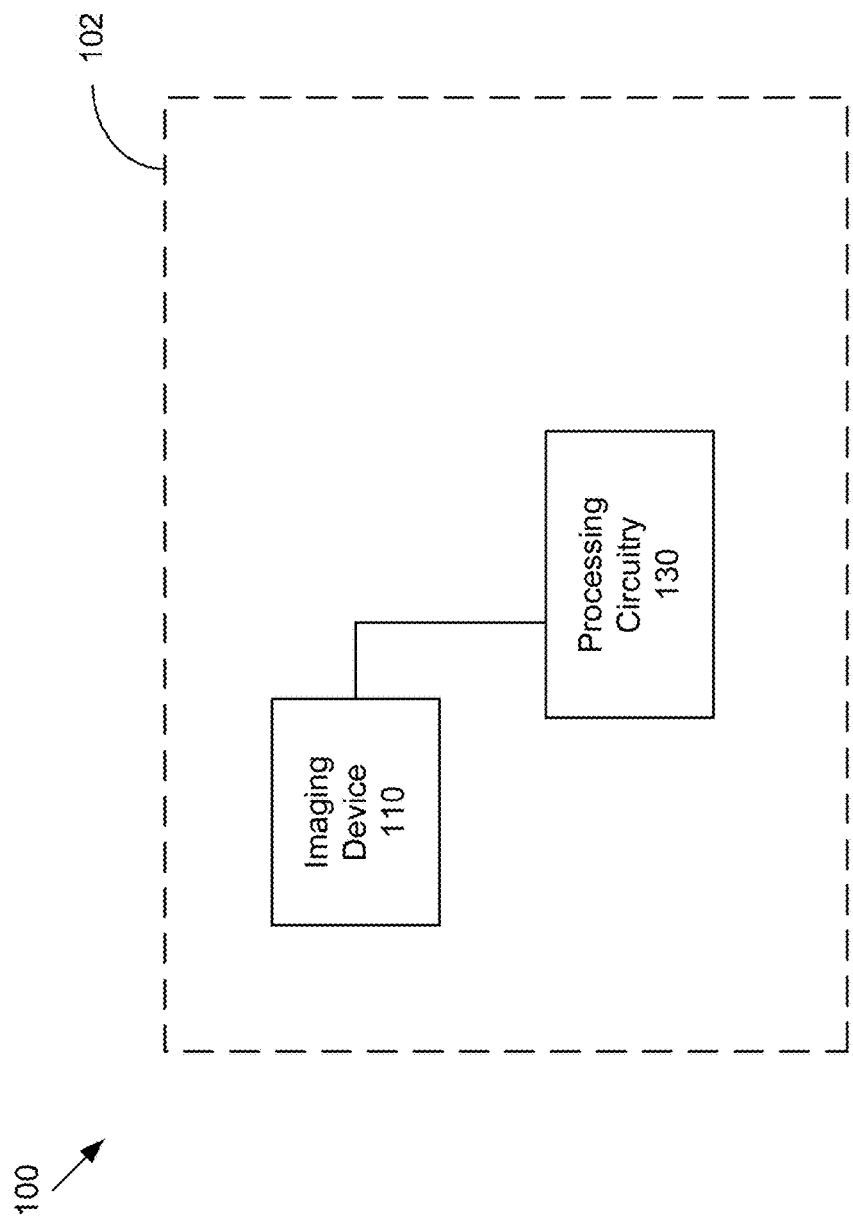
FIG. 1 illustrates an exemplary block diagram of an autonomous vehicle path planning system according to one or more aspects of the disclosed subject matter.

Referring now to the drawings, wherein like reference numerals designate identical or corresponding parts throughout the several views, FIG. 1 depicts an exemplary block diagram of an autonomous vehicle path planning system (herein referred to as system 100) for planning a path of an autonomous vehicle in response to identifying one or more cyclists at a traffic intersection according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can include an imaging device 110 and processing circuitry 120 (which can include internal and/or external memory). In an embodiment, the imaging device 110 and the processing circuitry 120 can be implemented in a stand-alone apparatus 102. The stand-alone apparatus 102 can be an autonomous vehicle or a highly automated vehicle, for example.

Generally speaking, the system 100 can plan a path for the autonomous vehicle 102 at a traffic intersection based on predicting a path of the one or more cyclists at the traffic intersection. A traffic intersection can be any intersection where two or more roads meet and/or cross. The traffic intersection may include traffic lights and/or stop signs. The imaging device 110 can detect information about a location of the one or more cyclists in the traffic intersection including a position of each of the one or more cyclists within a specific lane in the traffic intersection. Based on the information about the one or more cyclists received from the imaging device 110, the processing circuitry 120 can plan a path for the autonomous vehicle 102 based on the location and/or position of the one or more cyclists in the traffic intersection.

More specifically, based on the information received from the imaging device 110, the processing circuitry 120 can plan a path for the autonomous vehicle 102 by taking into account where a cyclist is positioned in the traffic intersection with respect to the autonomous vehicle 102 and predicting a path for the cyclist based on the cyclist's position. For example, the cyclist may be lined up to the right of, behind, or to the left of the autonomous vehicle 102. The information used to predict the path for the cyclist can be based on real world data of cyclists traveling through traffic intersections which can indicate a probability of how the cyclist will move based on the cyclist's position. If, for example, the cyclist is lined up to the left of the autonomous vehicle 102 and the real world data has indicated that most bikes cut across to the right in front of the autonomous vehicle, the path plan for the autonomous vehicle 102 can plan to not accelerate quickly at the intersection when the light turns from red to green. As a result, the processing circuitry 120 of the autonomous vehicle 102 will have taken into account the predicted path of the cyclist into the path planning for the autonomous vehicle 102.

The imaging device 110 can represent one or more imaging devices including one or more cameras, video cameras, Radar, LIDAR, and the like. The imaging device 110 can detect cyclists in common positions at the traffic intersection (e.g., see FIG. 2). For example, if the imaging device 110 detects a cyclist in a predetermined location in the traffic intersection, the processing circuitry 120 can predict a path that the cyclist will take based on the predetermined location.

The processing circuitry 120 can carry out instructions to perform or cause performance of various functions, operations, steps or processes of the system 100. The processing circuitry 120 can be configured to store information in memory, operate the system 100, and receive and send information in the form of signals) from the imaging device 110.

Figure 2:
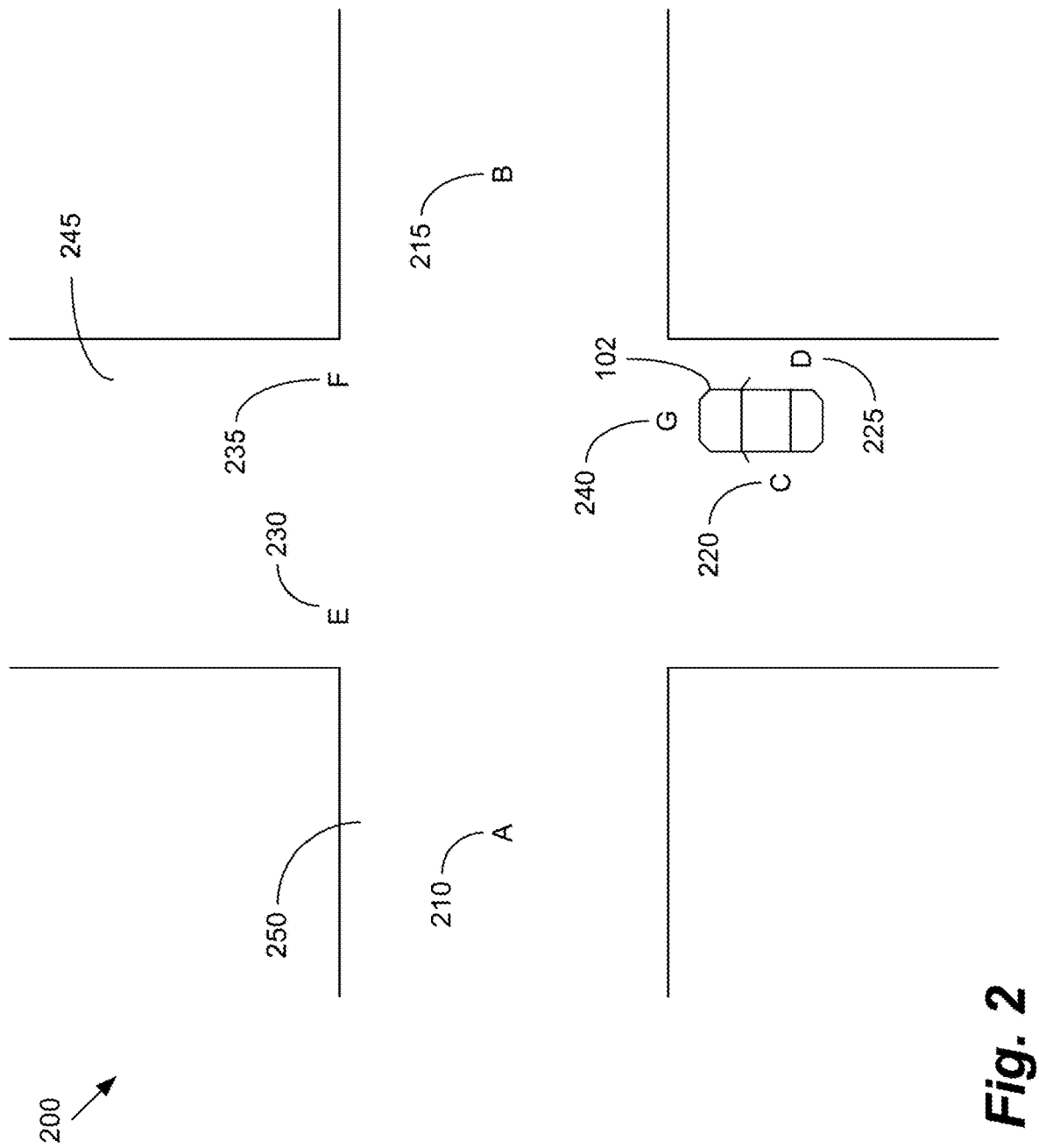
FIG. 2 illustrates an exemplary overview of cyclist positions in a traffic intersection according to one or more aspects of the disclose subject matter.

FIG. 2 illustrates an exemplary overview of cyclist positions in a traffic intersection 200 according to one or more aspects of the disclose subject matter. The traffic intersection 200 can include a street 245 and a cross street 250, Cyclist positions in the traffic intersection 200 can include position A 210, B 215, C 220, D 225, E230, F 235, and G 240. The rules of the traffic intersection 200 can be based on traffic lights. However, it should be appreciated that this is simply exemplary as the rules of the traffic intersection 200 can also be based on stop signs at a 4-way stop or a 2-way stop, include yield signs, include additional cross streets, and the like, for example. The autonomous vehicle 102 can be positioned in the traffic intersection 200 as if the autonomous vehicle 102 was stopped at a red light on the street 245. Because the processing circuitry 120 is identifying positions of cyclists in the intersection relative to the autonomous vehicle 102, the cyclist positions can be described relative to the autonomous vehicle 102. For example, position C 220 can correspond to a cyclist positioned to a left side of the autonomous vehicle 102 on the street 245. Position D 225 can correspond to a cyclist positioned to a right side of the autonomous vehicle 102 on the street 245. Position G 240 can correspond to a cyclist positioned in front of the autonomous vehicle 102 on the street 245. Position A 210 can correspond to a cyclist positioned to a left of the autonomous vehicle 102 on the cross street 250. Position B 215 can correspond to a cyclist positioned to a right of the autonomous vehicle 102 on the cross street 250. Position E 230 can correspond to a cyclist positioned across from the autonomous vehicle 102 on the street 245 and the cyclist is positioned in an opposite oncoming lane compared to the autonomous vehicle 102. Position F 235 can correspond to a cyclist positioned in front of the autonomous vehicle 102 on the street 245 and on an opposite side of the cross street 250 compared to the autonomous vehicle 102.

Each position A 210 through F 235 can include associated statistical data corresponding to a probability of the cyclist's expected movement through the intersection from that specific position. For example, Table 1 includes a probability of the cyclist's movement through the intersection for each position A 210 through F 235.

TABLE 1

| Cyclist initial position | Percentage | Turn-right (cyclist) | Turn-left (cyclist) | Go-straight (cyclist) | Stop (cyclist) | Turn-right (vehicle) | Turn-left (vehicle) | Go-straight (vehicle) | Stop (vehicle) |
|---|---|---|---|---|---|---|---|---|---|
| A: cross pass, from left | 5% | 0% | 40% | 55% | 5% | 20% | 5% | 40% | 35% |
| B: cross pass; from right | 6% | 48% | 6% | 38% | 8% | 10% | 14% | 36% | 40% |
| C: same direction. left | 3% | 8% | 24% | 56% | 12% | 40% | 0% | 40% | 20% |

TABLE 1-continued

| Cyclist initial position | Percentage | Turn-right (cyclist) | Turn-left (cyclist) | Go-straight (cyclist) | Stop (cyclist) | Turn-right (vehicle) | Turn-left (vehicle) | Go-straight (vehicle) | Stop (vehicle) |
|---|---|---|---|---|---|---|---|---|---|
| D: same direction, right | 52% | 3% | 3% | 90% | 4% | 14% | 0% | 68% | 12% |
| E: Opposite direction, left | 16% | 6% | 9% | 60% | 21% | 4% | 26% | 50% | 21% |
| F: Opposite direction, right | 7% | 0% | 6% | 71% | 21% | 26% | 3% | 61% | 10% |
| G: Same direction, in front | 12% | 4% | 20% | 72% | 4% | 23% | 23% | 46% | 8% |

Figure 3:
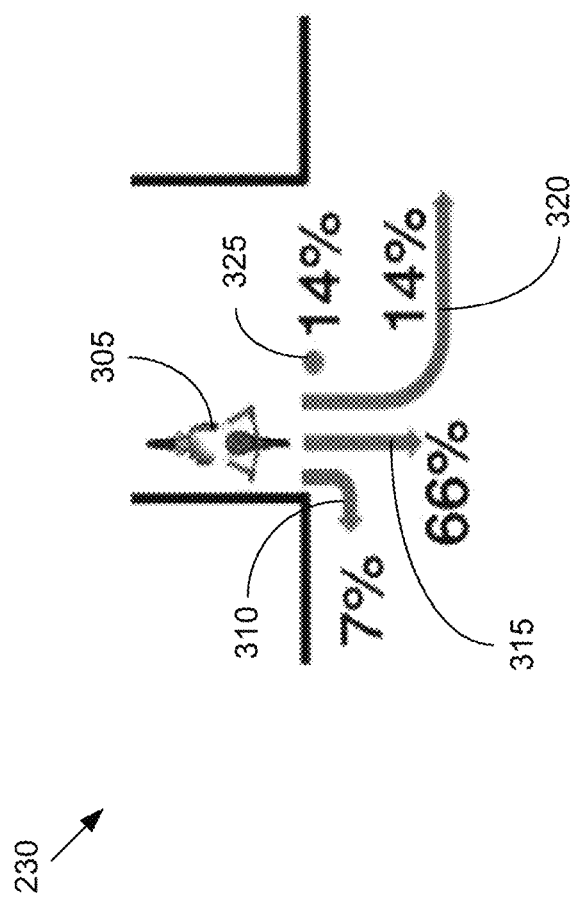
FIG. 3 illustrates an exemplary overview of a cyclist in a traffic intersection according to one or more aspects of the disclose subject matter.

FIG. 3 illustrates an exemplary overview of a cyclist 305 in position E 230 of the traffic intersection 200 according to one or more aspects of the disclose subject matter. From position E 230, the cyclist 305 may move through the intersection 200 following one of four paths. For example, the cyclist 305 may follow path 310 to turn right onto the cross street. The processing circuitry 120 can determine (e.g., via a look up table) that the cyclist in position E 230 may follow path 310 to turn right 7% of the time. The probability information used by the processing circuitry 120 to determine the probability of the movement of the cyclist 310 through the intersection 200 may be based on real world data collected from observing cyclists move through intersections from various initial positions, for example. Similarly, the cyclist 305 may follow path 315 to travel straight through the intersection 200 around 66% of the time. Additionally, the cyclist 305 may follow path 320 to turn left through the intersection 200 14% of the time. Finally, the cyclist 305 may follow path 325 in which the cyclist 305 may not move at all for a predetermined amount of time (e.g., because the cyclist is not paying attention) 14% of the time.

The probabilities described in FIG. 3 are exemplary based on real world data. However, the probabilities, of how a cyclist will move through the intersection can be updated periodically. Additionally, the probabilities may be different based on different traffic intersections and/or different rules of the road. Additionally, each of the cyclist positions described in FIG. 2 can have probabilities corresponding to that initial cyclist position in the traffic intersection.

The probabilities described in FIG. 3 can be used to predict a path that the cyclist will take through the intersection, and the processing circuitry 120 can plan a path for the autonomous vehicle 102 based on the predicted path of the cyclist.

Additionally, a future path of the cyclist can be predicted based on the position of the cyclist in the traffic intersection and in reference to surrounding vehicles (i.e. left side of vehicle or right side of vehicle). For example, the G, C, and D positions can be projected onto other locations in the intersection and not just surrounding the reference vehicle/autonomous vehicle (i.e., autonomous vehicle 102). More specifically, referring to Table 1, the chance of a bicyclist going straight is much higher if it is to the right of a vehicle (position C, 90%) than to the left (position D, 56%) (and opposite for turning left). This can be extrapolated to other locations in the intersection.

Figure 4:
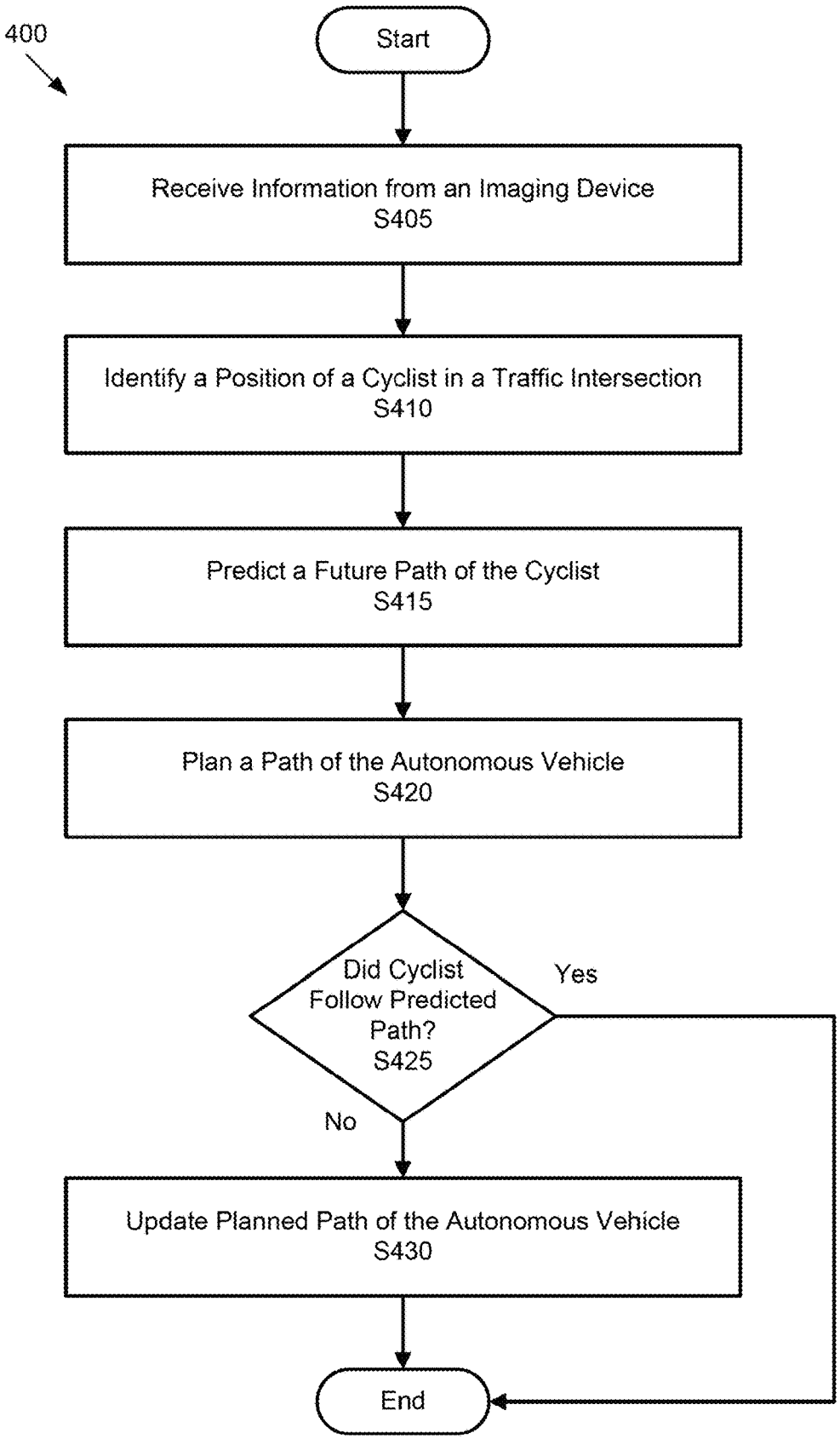
FIG. 4 is an algorithmic flow chart of a method for planning a path of an autonomous vehicle in response to identifying one or more cyclists at a traffic intersection according to one or more aspects of the disclose subject matter.

FIG. 4 is an algorithmic flow chart of a method 400 for planning a path of the autonomous vehicle 102 in response to identifying one or more cyclists at the traffic intersection 200 according to one or more aspects of the disclose subject matter.

In S405, the processing circuitry 120 can receive information from the imaging device 110. The received information can correspond to information about the environment surrounding the autonomous vehicle 102.

In S410, a position of a cyclist (e.g., cyclist 305 in position E 230) in the traffic intersection 200 can be identified based on the received information from the imaging device 110 in S405.

In S415, a future path of the cyclist can be predicted based on the identified position of the cyclist in S410. Because the identified position of the cyclist corresponds to probabilities of how the cyclist will move through the intersection 200, the future path of the cyclist can be predicted based on the cyclist's position in the intersection 200 and the corresponding probabilities (e.g., Table 1 and/or FIG. 3).

In S420, the processing circuitry 120 can plan a path of the autonomous vehicle 102 based on the future path of the cyclist in S415. For example, if the cyclist is lined up to the left of the autonomous vehicle 102 (e.g., position C 220) and the real world data has indicated that most cyclists cut across to the right in front of the autonomous vehicle 102, the processing circuitry 102 can plan to not accelerate quickly at the intersection when the light turns from red to green. As a result, the autonomous vehicle 102 can take the predicated path of the cyclist into account for planning the path of the autonomous vehicle 102. Additionally, the predicated path of the cyclist and/or the path plan for the autonomous vehicle 102 can be displayed in the autonomous vehicle 102 for the benefit of the operator of the autonomous vehicle. For example, the operator of the autonomous vehicle may find comfort in knowing that the autonomous vehicle has identified one or more cyclists in the intersection, is predicting the paths of each cyclist, and is planning the path of the autonomous vehicle accordingly.

In S425, it can be determined if the cyclist followed the predicated path. For example, the path planning for the autonomous vehicle 102 may initially be based on the cyclist's movement that corresponds to the highest probability (e.g., path 315). However, if it is determined that the cyclist begins to turn right, for example, rather than move straight through the intersection as predicted, then the processing circuitry 120 can update the planned path of the autonomous vehicle 102. The processing circuitry 120 can determine that the cyclist is following a different path than the predicted path based on information received from the imaging device 110, for example. If the cyclist did follow the predicted path, the process can end. However, if the cyclist did not follow the predicted path, then the planned path of the autonomous vehicle 102 can be updated in S430.

In S430, the planned path for the autonomous vehicle 102 can be updated in response to the cyclist not following the initial predicted path. For example, if the predicted path of the cyclist corresponded to the cyclist starting on the left side of the autonomous vehicle 102 and cutting across to the right in front of the autonomous vehicle 102, as soon as the cyclist begins turning left (i.e., not following the predicted path), and therefore not cutting to the right in front of the autonomous vehicle 102, the path plan of the autonomous vehicle 102 can be updated accordingly.

After the path plan of the autonomous vehicle 102 is updated in S430, the process can end.

In the above description of FIG. 4, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

The system 100 can have several advantages. For example, the system 100 can take the positions of cyclists in an intersection into account when navigating the intersection. Further, the cyclist's movement through the intersection can be predicted based on probabilities corresponding to the cyclist's initial position in the intersection. Accordingly, the autonomous vehicle 102 can plan, a path through the intersection with significantly increased safety. Another advantage is updating the path plan of the autonomous vehicle 102 when the cyclist does not follow the predicted path. The autonomous vehicle 102 can maximize safety and efficiency by considering the predicted path of the cyclists and then adjusting if the cyclist is no longer a consideration (or if the cyclist moves into an even more dangerous position) for the autonomous vehicle 102 when traveling through the intersection.

Another advantage is that the predicted future path of the cyclist and the path planned by the autonomous vehicle 102 in light of the predicted path of the cyclist can be displayed so that an operator of the autonomous vehicle 102 can view the predicted path of the cyclist and the planned path of the autonomous vehicle 102. As a result, the operator of the autonomous vehicle 102 can be confident that the autonomous vehicle 102 has identified any cyclists in the intersection and is reacting accordingly.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A system, comprising:
   an imaging device; and
   processing circuitry configured to
   receive information from the imaging device,
   identify a position of a cyclist in a traffic intersection based on the information from the imaging device,
   predict a future path of the cyclist based on the position of the cyclist in the traffic intersection, and
   plan a path of an autonomous vehicle based on the predicted future path of the cyclist, the planned path including a limit to a rate of acceleration of the autonomous vehicle while overtaking the cyclist.

2. The system of claim 1, wherein the processing circuitry is further configured to
   determine if the cyclist followed the predicted future path, and
   update the planned path of the autonomous vehicle in response to the cyclist not following the predicted future path.

3. The system of claim 1, wherein each position of the cyclist in the traffic intersection is associated with statistical information corresponding to a probability for a plurality of the cyclist's possible movements through the traffic intersection.

4. The system of claim 3, wherein the plurality of the cyclist's movements through the intersection include turning left, turning right, traveling straight, and not moving.

5. The system of claim 1, wherein the predicted future path of the cyclist is displayed in the autonomous vehicle.

6. The system of claim 1, wherein the planned path of the autonomous vehicle is displayed in the autonomous vehicle.

7. The system of claim 3, wherein the probabilities for the plurality of the cyclist's possible movements through the traffic intersection are based on real world data observing cyclists traveling through traffic intersections.

8. A method for planning a path of an autonomous vehicle, comprising:
   receiving, via processing circuitry, information from an imaging device;
   identifying, via the processing circuitry, a position of a cyclist in a traffic intersection based on the information from the imaging device;
   predicting, via the processing circuitry, a future path of the cyclist based on the position of the cyclist in the traffic intersection; and
   planning, via the processing circuitry, a path of the autonomous vehicle based on the predicted future path of the cyclist the planned path including a limit to a rate of acceleration of the autonomous vehicle while overtaking the cyclist.

9. The method of claim 8, further comprising:
   determining if the cyclist followed the predicted future path; and updating the planned path of the autonomous vehicle in response to the cyclist not following the predicted future path.

10. The method of claim 8, wherein each position of the cyclist in the traffic intersection is associated with statistical information corresponding to a probability for a plurality of the cyclist's possible movements through the traffic intersection.

11. The method of claim 10, wherein the plurality of the cyclist's movements through the intersection include turning left, turning right, traveling straight, and not moving.

12. The method of claim 8, wherein the predicted future path of the cyclist is displayed in the autonomous vehicle.

13. The method of claim 8, wherein the planned path of the autonomous vehicle is displayed in the autonomous vehicle.

14. The method of claim 10, wherein the probabilities for the plurality of the cyclist's possible movements through the traffic intersection are based on real world data observing cyclists traveling through traffic intersections.

15. A non-transitory computer-readable storage medium storing computer-readable instructions that, when executed by a computer, cause the computer to perform a method, the method comprising:
   receiving information from the imaging device;
   identifying a position of a cyclist in a traffic intersection based on the information from an imaging device;
   predicting a future path of the cyclist based on the position of the cyclist in the traffic intersection; and
   planning a path of the autonomous vehicle based on the predicted future path of the cyclist, the planned path including a limit to a rate of acceleration of the autonomous vehicle while overtaking the cyclist.

16. The non-transitory computer-readable storage medium of claim 15, further comprising:
   determining if the cyclist followed the predicted future path; and
   updating the planned path of the autonomous vehicle in response to the cyclist not following the predicted future path.

17. The non-transitory computer-readable storage medium of claim 15, wherein each position of the cyclist in the traffic intersection is associated with statistical information corresponding to a probability for a plurality of the cyclist's possible movements through the traffic intersection.

18. The non-transitory computer-readable storage medium of claim 17, wherein the plurality of the cyclist's movements through the intersection include turning left, turning right, traveling straight, and not moving.

19. The non-transitory computer-readable storage medium of claim 15, wherein the predicted future path of the cyclist and the planned path of the autonomous vehicle are displayed in the autonomous vehicle.

20. The non-transitory computer-readable storage medium of claim 17, wherein the probabilities for the plurality of the cyclist's possible movements through the traffic intersection are based on real world data observing cyclists traveling through traffic intersections.

* * * * *